United States Patent [19]
Kopf

[11] 3,847,809
[45] Nov. 12, 1974

[54] PROPORTIONING SYSTEM
[75] Inventor: J. David Kopf, Tujunga, Calif.
[73] Assignee: David Kopf System, Tujunga, Calif.
[22] Filed: July 3, 1972
[21] Appl. No.: 268,308

[52] U.S. Cl................... 210/22, 210/96, 210/321
[51] Int. Cl.................... B01d 31/00, B01d 13/00
[58] Field of Search.......... 210/96, 321, 22; 137/92, 137/563, 60 H

[56] References Cited
UNITED STATES PATENTS

| | | | |
|---|---|---|---|
| 3,508,656 | 4/1970 | Serfass et al. | 210/96 X |
| 3,563,381 | 2/1971 | Edelson et al. | 210/96 |
| 3,528,550 | 9/1970 | Cappelen, Jr. | 210/321 X |
| 3,626,670 | 12/1971 | Pecker | 210/321 X |
| 3,722,680 | 3/1973 | Smith | 210/96 |

Primary Examiner—Frank A. Spear, Jr.
Attorney, Agent, or Firm—Bruce H. Johnsonbaugh

[57] ABSTRACT

A proportioning device and method for mixing two fluids in predetermined proportions. A portion of one fluid flowing through a first flow path is discharged into a second fluid flowing at different flow rates through a second flow path, creating a mixture of the two fluids. The proportions of the two fluids in the mixture are measured, and in response to this measurement, the discharge rate of the first fluid into the second fluid is adjusted to maintain the desired mix ratio.

12 Claims, 5 Drawing Figures

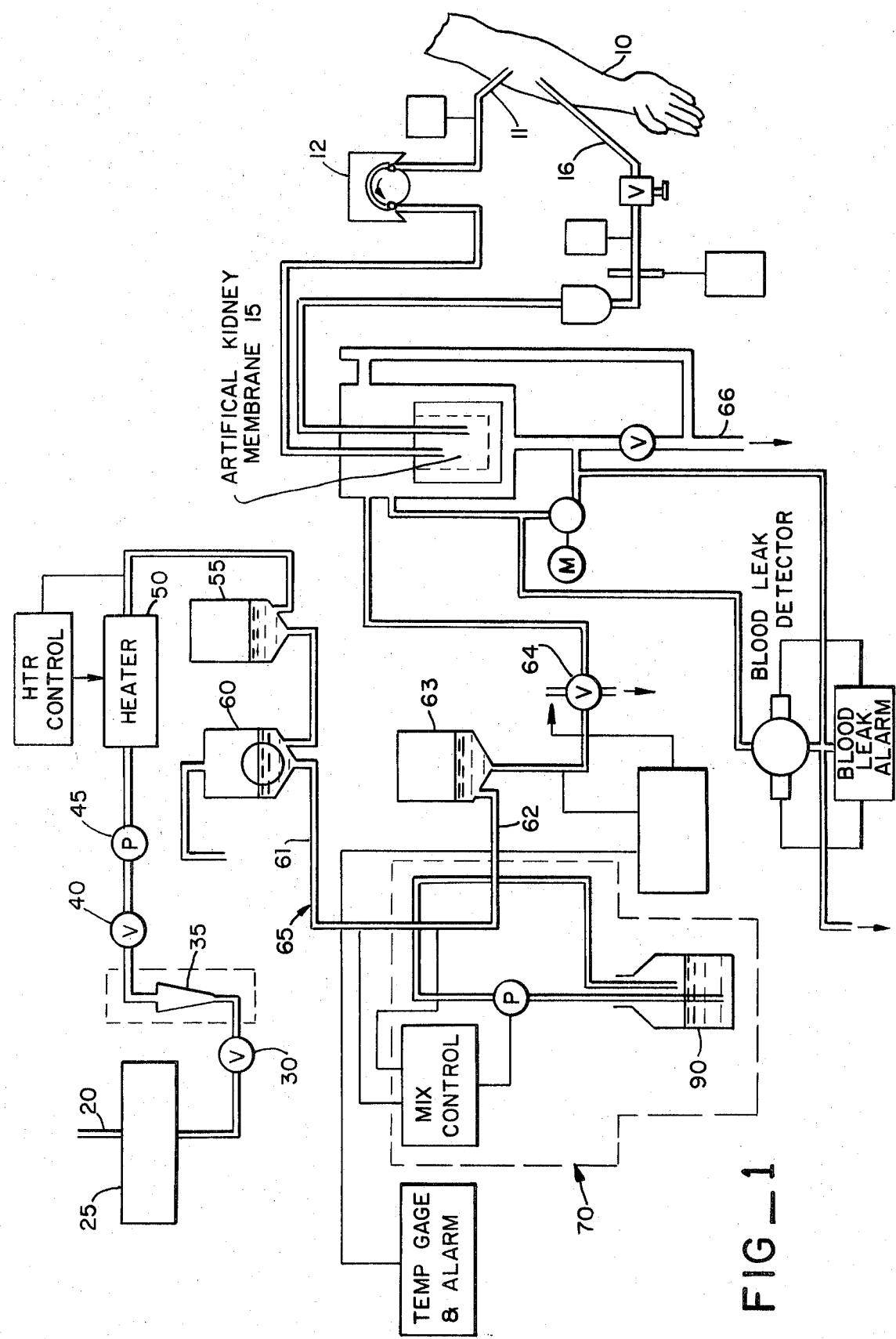
FIG_1

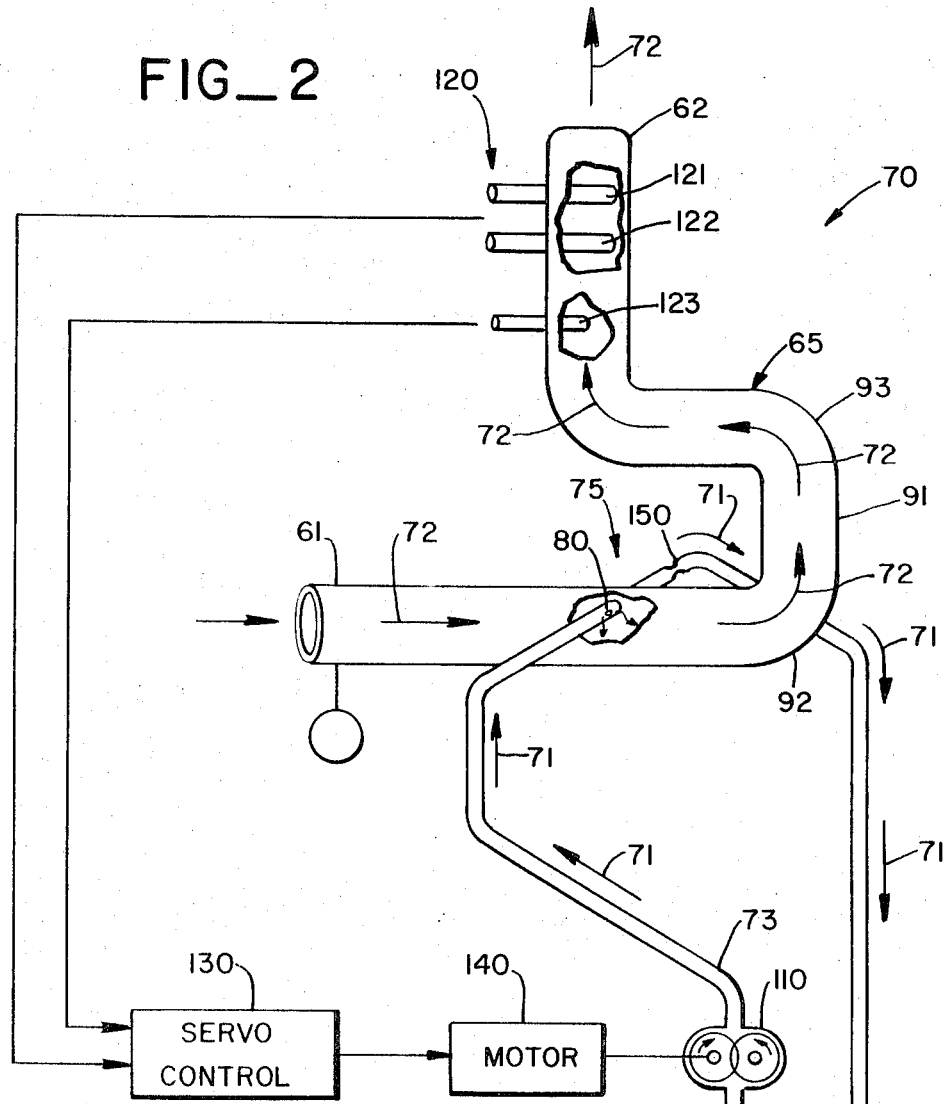
FIG_2
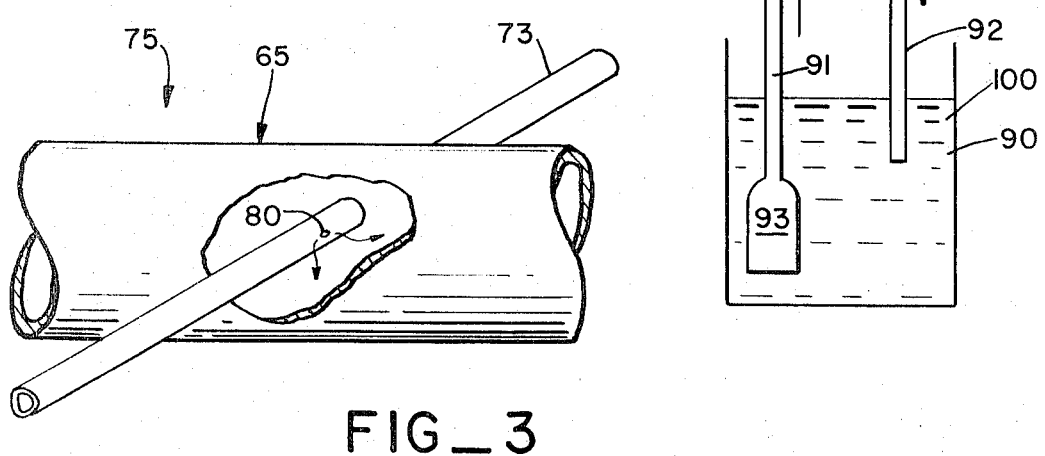
FIG_3

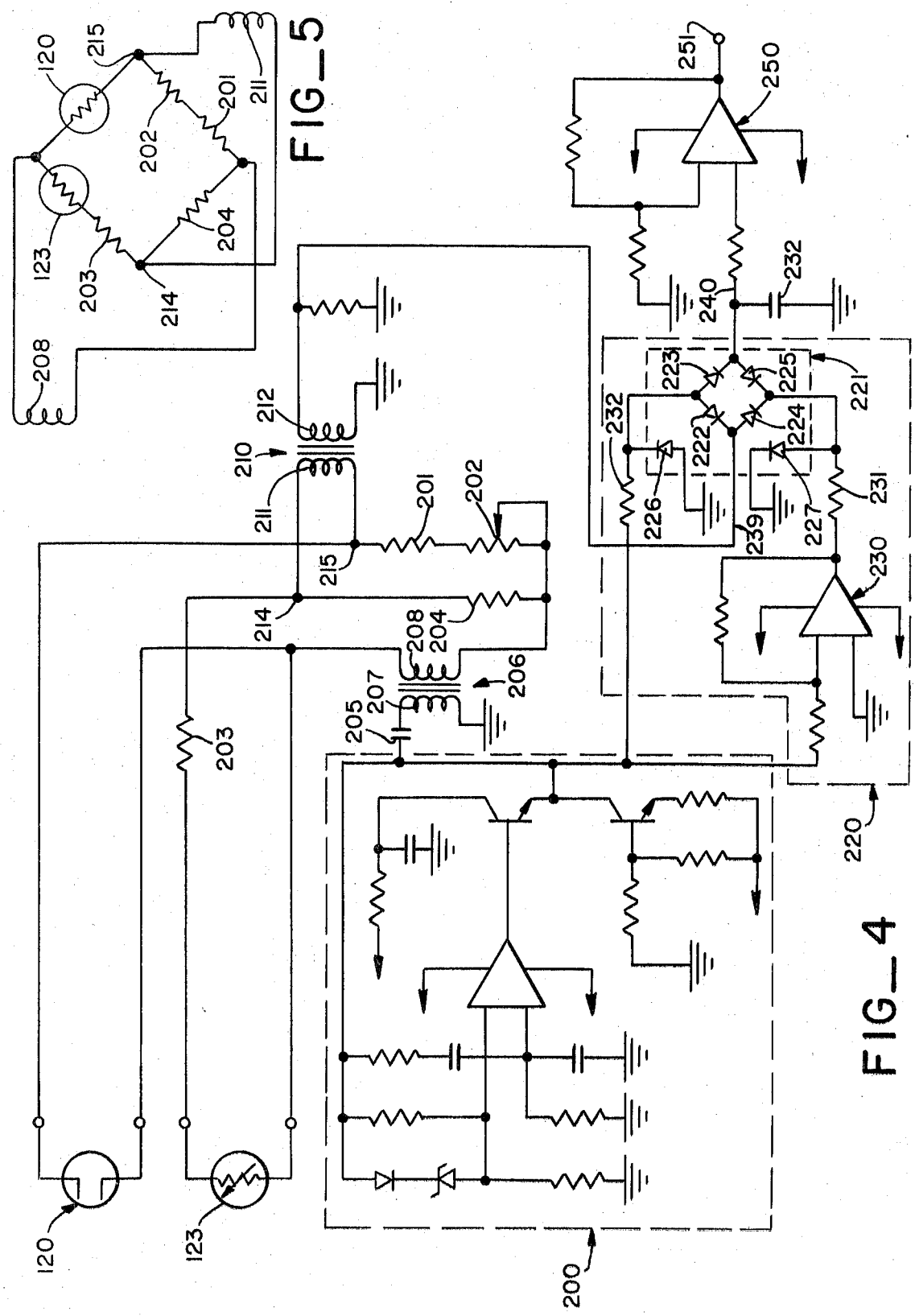

PROPORTIONING SYSTEM

This invention pertains generally to proportioning devices which mix two fluids together.

More specifically, this invention pertains to a proportioning device used to mix a concentrated saline solution ("concentrate") and water into a dialysate solution used in hemodialysis.

Individuals suffering kidney failure can only be successfully treated by an immediate transplant or by the use of an artificial kidney machine, since damaged kidney tissue is non-regenerative.

External artificial kidney machines are used to cleanse a patient's blood of waste material, a process otherwise performed by healthy kidneys. This is typically accomplished by circulating a portion of the patient's blood across one side of a semipermeable membrane and circulating a saline solution ("dialysate") on the other side of the membrane, the membrane being permeable to waste material from the patient's blood and impermeable to blood cells.

It is extremely important that the dialysate be maintained at a proper level of saline concentration to avoid adverse effects upon the patient caused by the removal of too much salt from the patient's blood or the transmission into the patient's blood of an excess concentration of salt.

The preferred embodiment of this invention pertains to the preparation of the dialysate which is circulated across one surface of an artificial kidney membrane.

The prior art shows two basic approaches to the problem of mixing dialysate. The first is the batch delivery system in which an operator mixes the necessary saline solution and water in a large single tank before each dialysis treatment. The tanks are bulky, difficult to clean and provide a favorable medium for bacterial growth.

The second alternative, to which this invention pertains, is a proportioning system which uses a steady flow of water from a municipal water supply and mixes therewith relatively small amounts of concentrated saline solution ("concentrate"). Proportioning systems eliminate large storage tanks and operate automatically.

The concentrate solution is typically combined with water in the proportions of 1 unit of concentrate per 34 or 35 units of water depending upon the characteristics of the particular concentrate used. The proportions must be maintained within one or two percent. An example of a concentrate which may be used in this invention is Formula 12 Hemotrate of McGaw Company, which contains, per liter:

Sodium chloride — 194 grams
Sodium acetate — 167 grams
Calcium chloride — 6.4 grams
Magnesium chloride hexahydrate — 5.3 grams
(pH adjusted with hydrochloric acid)

Each liter of this particular concentrate is diluted with 35 parts of water to form dialysate for use in hemodialysis. When diluted, this concentrate will form a dialysate with the following mEq/liter: Sodium — 130, Calcium — 2.5, Magnesium — 1.5, Chloride — 99 and Acetate — 35.

During a dialysis treatment, water typically flows through the artificial kidney at a rate of 500 ml/min (0.13 gallons per min.) and at this flow rate, concentrate must be combined with the water at the rate of 14.3 ml/min (0.0037 gallons per min.). The concentrate flow rate should be regulated to within 1 percent of this flow or 0.143 ml/min (0.000037 gal. per min.). Occasionally, the desirable dialysate flow rate is only about 100 ml/min (0.00074 gal. per min.), for which the appropriate concentrate flow rate tolerance is only 0.028 ml/min (0.0000072 gal. per min.). It is therefore important to use a proportioning system which is capable of controlling accurately relatively low flow rates of concentrate.

At these low flow rates, the use of small orifices to control fluid flow is complicated by the fact that the concentrate, being a relatively highly concentrated saline solution, tends to precipitate and the resulting salt crystals tend to clog small orifices.

The present invention provides a method and system for mixing concentrate and water in accurately controlled proportions for use in artificial kidney machines.

A principal object of this invention is to provide a means for mixing two fluids in predetermined proportions.

Another principal object of this invention is to provide means for continuously mixing in predetermined proportions concentrate and water flowing at different flow rates into dialysate for use in hemodialysis.

Another object of this invention is to provide a system for mixing water with low flow rates of concentrate to form dialysate for use in hemodialysis and maintaining the accuracy of the concentration of the dialysate within very close tolerances.

A further object of this invention is to provide a proportioning device for continuously mixing dialysate which is extremely reliable at low flow rates and effectively prevents the precipitation of salt crystals from the concentrate.

Another object of this invention is to provide a proportioning device for mixing dialysate in which a relatively large capacity pump is used to accurately control relatively low flow rates of concentrate.

A further object of this invention is to provide a proportioning device for continuously mixing, in predetermined proportions, concentrate and water into dialysate which accommodates various concentrate solutions and in which the predetermined proportions may be selected from a range of values.

Further objects and advantages of this invention will become apparent from consideration of the following description of a preferred embodiment and the accompanying drawings wherein:

FIG. 1 is a schematic representation of an artificial kidney machine embodying the present invention;

FIG. 2 is a schematic representation of the proportioning device of this invention;

FIG. 3 is an enlarged view in perspective, partially in section, showing a component of the proportioning device shown in FIG. 2;

FIG. 4 is a circuit diagram of a control system which may be used in the present invention; and FIG. 5 is a circuit diagram showing a portion of the circuit diagram shown in FIG. 4.

FIG. 1 shows an artificial kidney machine which is connected to a patient's arm 10. Line 11 passes blood from an artery through a pump 12, across one side of kidney membrane 15 and into return line 16, which returns the cleansed blood to a vein in the patient's arm 10.

Water, which may be received from a conventional tap from a municipal water supply, enters line 20 under pressure, flows through a pressure regulator 25, control valve 30, and flow meter 35.

A venturi 40 and vacuum pump 45 cooperate to convert dissolved air in the water into entrained bubbles. The water is then heated by heater 50, accumulated by accumulator 55, and deaerated by giving up entrained air at bubble trap 60.

The heated and deaerated water next enters the proportioning device of this invention shown generally as 70 in FIG. 1. Proportioning device 70 is shown in greater detail in FIG. 2. Referring to FIG. 1, water flowing past point 61 into proportioning device 70 is mixed with concentrate stored in jug 90 to form a mixture of concentrate and water, or dialysate, which passes through conduit 65, past point 62, thence through accumulator 63, control valve 64, and across the side of kidney membrane 15 opposite that across which the blood flows. Dialysate containing waste from the patient's blood then passes through line 66 to drain.

FIG. 2 shows in greater detail the proportioning device of this invention. The purpose of this proportioning device is to combine concentrate solution flowing through a first conduit 73 with a flowstream of water flowing at different rates through a second conduit 65. The flow path 72 of the water through the proportioning device extends from point 61 to point 62 of conduit 65.

The flow paths 71 and 72 intersect at a point noted generally as 75 and shown in greater detail in FIG. 3.

At intersection 75, conduit 73 contains an orifice 80 which allows concentrate to escape into flow path 72 in conduit 65 and thereby mix with the water flowing along path 72. The diameter of orifice 80 may be 0.026 inch. The diameter of tube 72, through which concentrate flows, may be ⅛ inch outer diameter and 1/16 inch inner diameter.

The rate at which concentrate is discharged through orifice 80 from conduit 73 is determined by the pressure differential across orifice 80. In this embodiment, the pressure of the concentrate flowing in conduit 73 is maintained at a higher pressure (6 p.s.i., for example) near orifice 80 than the pressure of water (5 p.s.i., for example) flowing past orifice 80 in conduit 65.

It is recognized that orifice 80 could be formed in the surface of conduit 73 at a number of different places. As shown in FIGS. 2 and 3, it is located at the downstream portion of conduit 73 relative to the flow of water in conduit 65. Orifice 80 could be located at the uppermost point of conduit 73 or could be located at the upstream portion of conduit 73. An advantage of locating orifice 80 at the downstream portion of conduit 73 is that convection currents formed in the flowstream of water tend to provide a rapid mixture of concentrate and water.

It is also recognized that a plurality of orifices could be provided without departing from the spirit of this invention.

The concentrate flow path 71 is for the most part a closed circuit, that is, concentrate solution 100 is stored in jug 90 and is recirculated through conduit means 73 by pump means 110. Concentrate enters inlet 93 and is pumped past orifice 80, restriction 150 and point 92 back into jug 90. Flow path 71 is closed with the exception of orifice 80, which allows a portion of the circulating concentrate to be discharged into the flowstream of water in conduit 65.

Blending means 91 comprises a plurality of sharp bends 92 and 93 in conduit 65 immediately downstream of intersection or mixing point 75. Blending means 91 thoroughly mixes the concentrate and water prior to the measurement of the conductivity of the dialysate mixture.

Only a small portion of the circulating concentrate is discharged through orifice 80. The flow rate of concentrate recirculated through conduit 73 is large compared to the amount of concentrate discharged through orifice 80, because of the relatively small pressure drop across orifice 80 (about 1 p.s.i.) and the relative cross-sectional areas of conduit 73 and orifice 80. The ratio of cross-sectional areas of conduit 73 and orifice 80 is about 6 to 1. The ratio can be varied widely without departing from this invention. This ratio provides several advantages. It allows the use of a relatively large capacity pump means 110 to control relatively low flow rates of concentrate through orifice 80. Also, the concentrate flowing past orifice 80 tends to wash the orifice, preventing the formation of bubbles at orifice 80 and the precipitation of salt at orifice 80. The recirculation of concentrate in jug 90 also reduces precipitation of salts in jug 90.

Measuring means 120 comprises conductivity probes 121 and 122 mounted in conduit 65 downstream of intersection 75 to monitor the proportion of concentrate in the flowstream of dialysate on conduit 65. Since the water flowing in conduit 65 is essentially electrically non-conductive, and since the concentrate is highly conductive, the ratio or proportion of concentrate in the flowstream in conduit 65 downstream of intersection 75 is proportional to the conductivity of the mixture.

As described below, the control means controls the mixture of the fluids to maintain a desired conductivity. The desired conductivity level can be adjusted to accommodate differences in patients, differences in concentrates and minor differences in mix proportions of concentrate and water.

This system also can easily accommodate concentrates which require substantially different mix proportions or dilution rates. The parameters of the preferred embodiment are designed for optimum operation with concentrates with dilution rates of 34 or 35 parts water to 1 part concentrate, but the preferred embodiment can accept concentrates with different dilution rates. The basic parameters controlling dilution rate are the pressure differential maintained across orifice 80 (which is a drop of about 1 p.s.i.), the diameter of orifice 80 (about 0.026 in.), and the flow rates in conduit 65 (about 100–500 ml/min). By varying any or all of these basic parameters, different dilution rates may be obtained.

By knowing the desired dilution rate and desired dialysate conductivity for a given concentrate, this system can be easily modified to accept virtually any concentrate.

Also, this system compensates for variations in the supply of concentrate. If a portion of the concentrate supplied to the system is partially diluted, the system automatically compensates by discharging more of the dilute concentrate through orifice 80 to achieve the desired dialysate mixture. The system similarly compensates for portions of the concentrate supply which are too highly concentrated, by discharging less of the concentrate through orifice 80. Thus, as concentrate jug 90 empties, differences in concentration are compensated. Jug 90 may be refilled with variations in the new concentrate supply being similarly compensated.

Measuring means 120 is connected electrically to a control means for adjusting the discharge rate of concentrate into the water which includes servo control 130 and pressure regulating means which includes in the embodiment shown, motor 140, pump means 110 and restriction 150 in conduit 73. The pressure regulating means could alternatively include motor 140, a pump means comprising a constant speed pump, and a variable restriction in conduit 73 downstream of orifice 80.

If the conductivity of the dialysate sensed by probes 121 and 122 is too low, i.e., below the desired amount, indicating a shortage of concentrate in the dialysate, an electronic servo control 130 cooperates with a pressure regulating means (which includes motor 140, pump means 110 and restriction 150) to increase the speed of motor 140, which in turn speeds up pump means 110, thereby increasing the pressure of the concentrate in conduit 73 at intersection 75, due to the increased flow rate along flow path 71 and restriction 150 downstream of intersection 75. A greater pressure differential is therefore created across orifice 80, and concentrate is discharged therethrough at an increased rate. Conversely, if probes 121 and 122 indicate a higher level of conductivity in the mixture or dialysate than is desired, servo control 130 decreases the speed of motor 140, which in turn decreases the speed of pump means 110, thereby decreasing the pressure of the concentrate solution and reducing the rate at which concentrate discharges through orifice 80 into conduit 65. Pump means 110 is a variable speed pump in this embodiment.

FIG. 4 shows an electronic servo control circuit which may be used in conjunction with this invention. The circuit of FIG. 4 contains an oscillator 200, a synchronous demodulator 220 and a bridge circuit (shown also in FIG. 5), which contains conductivity probe 120 and resistors 201 and 202 in one leg and thermistor 123 and resistors 203 and 204 in the other leg of the bridge.

Oscillator 220 is a Wien-bridge oscillator designed to oscillate between 10 and 20 kHz.

The output of oscillator 200 is capacitively coupled by capacitor 205 to the primary 207 of transformer 206. The secondary 208 of transformer 206 energizes the balanced bridge shown in FIG. 5. The equivalent resistor formed by the series connection of the thermistor 123 and resistor 203 has the same temperature coefficient as that of the resistor represented by conductivity probe 120. The value of resistor 204 is numerically equal to the sum of the resistances of resistor 203 and thermistor 123 at the desired operating temperature of the dialysate. The sum of the values of resistors 201 and 202 is equal to the resistance of conductivity probe 120 when the dialysate is properly mixed and heated to the desired operating temperature.

The primary 211 of transformer 210 is connected between nodes 214 and 215 to provide the bridge error signal to secondary 212 of transformer 210.

Transformers 206 and 210 provide a high degree of electrical isolation between the components that come into contact with the dialysate and the rest of the electronic circuits, for the safety of the patient.

The error signal is null when dialysate conductivity is at the desired level. The error signal increases positively as dialysate conductivity increases above the desired level; and when conductivity decreases below the desired value, the error signal also increases, but with negative polarity.

Synchronous demodulator 220 allows the circuit to distinguish between a positive and a negative error signal at secondary winding 212.

The output of synchronous demodulator 220 appears at point 240 as a DC signal with a magnitude proportional to the amplitude of the error signal and a polarity the same as that of the error signal.

An analog gate 221 is provided which has an array of six identical diodes, four of which (222, 223, 224 and 225) are connected to form a balanced bridge. The gate conducts when the output of oscillator 200 is positive, and in the conducting phase, gate 211 is open, allowing current to flow through the gate from point 239 to 240. When the output of oscillator 200 is negative, gate 221 is closed and current goes to ground through diodes 226 and 227.

An inverting amplifier 230 reverses the polarity of oscillator 200. Resistors 231 and 232 have the same resistances. Therefore, gate 221 is driven by two identical voltage sources of opposite polarity and through identical resistors.

Thus, if the conductivity of the dialysate becomes too large, a positive error signal appears at secondary winding 212 of transformer 210, which is passed through gate 221 and integrated by capacitor 232, amplified by amplifier 250 and appears at output 251 as a positive DC voltage with amplitude proportional to the error signal.

The output appearing at point 251 is then amplified in a two-stage amplifier and used to drive DC motor 140 as shown in FIG. 2 through a filter which blocks the electrical transients generated by the commutator of the DC motor 140.

What is claimed is:

1. A method for use in hemodialysis of forming a dialysate by mixing predetermined amounts of a fluid in a flow stream and maintaining the ratio of fluid in said flow stream for various flow rates, comprising the following steps:

constantly recirculating a first fluid along a first flow stream, passing a second fluid through a conduit to form a second flow stream, diverting a regulated amoung of said constantly recirculating first fluid at a preselected discharge point and discharging the same into said second flow stream at said discharge point while maintaining the constant recirculation of the remainder of said first fluid in said first flow stream, allowing said first and second fluids to mix, measuring the proportion of said first fluid and said second flow stream at a point downstream from which the fluids have been mixed, and adjusting the rate at which said first fluid is discharged into said second flow stream.

2. A method for use in hemodialysis of forming a dialysate by mixing predetermined amounts of first and second fluids in a flow stream and maintaining the ratio of the fluids in said flow stream for various flow rates, comprising the following steps:

continuously passing a first fluid through a first conduit under pressure, passing a second fluid through a second conduit under pressure less than that in said first conduit, diverting a regulated amount of said constantly passing first fluid at a preselected discharge point and discharging the same from said first conduit into said second conduit at said discharge point while maintaining the constant passing of said first fluid through said first conduit, allowing said first and second fluids to mix in a flow stream through said second conduit, measuring the proportion of said first fluid in the flow stream at a point downstream from where the fluids have mixed, and adjusting the rate at which said first fluid is discharged into said second conduit to maintain a predetermined proportion of said first fluid in the flow stream.

3. A method for use in hemodialysis of forming a dialysate by mixing two fluids in predetermined and controlled proportions comprising the following steps:

continuously recirculating a first fluid through a first flow path, passing a second fluid through a second flow path which intersects said first flow path, diverting a regulated amount of said constantly recirculating first fluid at said intersection and discharging the same into said second flow path at said intersection while maintaining the continuous recirculation of the remainder of said first fluid in said first flow path, measuring the proportions of said first and second fluids in said second flow path downstream of said intersection, and controlling the rate at which said first fluid is discharged into said second flow path in response to said measuring, by increasing the discharge rate of said first fluid when the proportion of said first fluid is too low, and decreasing the discharge rate of said first fluid when the proportion of said first fluid is too high.

4. A method for continuously mixing, in predetermined portions, concentrate solution and water for use in kidney dialysis comprising the following steps:

continuously circulating the concentrate solution at a regulated pressure through a first flow path, passing water through a second flow path, diverting a regulated amount of said constantly circulating concentrate solution at a preselected discharge point and discharging the same into said second flow path while maintaining the constant circulation of the remainder of said concentrate solution if said first flow path, thereby forming a mixture of concentrate solution and water, continuously measuring the electrical conductivity of said mixture, and by using the electrical conductivity of said mixture as an indication of the proportions of concentrate solution and water, and continuously controlling the rate at which the concentrate solution discharges into said water by regulating the pressure of the circulating concentrate solution in response to said continuous measuring of conductivity, increasing said pressure when said conductivity is too low, and decreasing said pressure when said conductivity is too high.

5. The method of claim 4 wherein said first and second flow paths intersect.

6. In an artificial kidney machine, a proportioning device for mixing two fluids in predetermined proportions comprising:

a first conduit through which a first fluid constantly recirculates, a second conduit through which a second fluid flows, an orifice in the surface of said first conduit through which a portion of said first fluid is discharged into said second conduit while maintaining the constant recirculation of the remainder of the said first fluid through said first conduit, said portion of said first fluid forming a mixture with said second fluid, measuring means for measuring the proportions of said first and second fluids in said mixture, and control means cooperating with said measuring means for controlling the rate at which said first fluid escapes through said orifice, thereby maintaining the desired proportions of said first and second fluids in said mixture.

7. The device of claim 6 wherein said control means includes an electronic servo control responding to said measuring means and pressure regulated means for regulating the pressure of said first fluid in the vicinity of said orifice in response to said electronic servo control, increasing said pressure when the proportion of said first fluid in said mixture is too low and decreasing said pressure when the proportion of said fluid in said mixture is too high, said pressure regulating means having a motor, a variable speed pump driven by said motor, and a restriction in said first conduit downstream of said orifice.

8. The device of claim 7 wherein said pressure regulating means comprises a constant speed pump and a variable restriction in said first conduit downstream of said orifice, said variable restriction being controlled by said electronic servo control.

9. For use in an artificial kidney machine, a proportioning device for continuously mixing concentrate and water in predetermined proportions comprising:

a first conduit through which concentrate flows at a controlled pressure, a second conduit through which water flows, the surface of said first conduit having an orifice through which a portion of said concentrate flowing through said first conduit is discharged into said second conduit at a mixing point with the remainder of said concentrate continuing to flow in said first conduit past said orifice, and control means cooperating with said measuring means for controlling the rate at which concentrate passes through said orifice, thereby maintaining the desired mix proportions of water and concentrate.

10. The device of claim 9 wherein said second conduit intersects said first conduit at the location of said orifice and wherein said control means maintains a pressure drop across said orifice, the pressure of said concentrate in said first conduit being greater than the pressure of said water in said second conduit near said orifice.

11. The device of claim 9 wherein the cross-sectional area of said first conduit at the location of said orifice is at least five times greater than the cross-sectional area of said orifice.

12. The device of claim 9 further comprising blending means having a plurality of sharp bends in said second conduit, said blending means blending the concentrate and water mixture in said second conduit immediately downstream of said orifice.

* * * * *